(12) United States Patent
Wu et al.

(10) Patent No.: US 12,621,175 B2
(45) Date of Patent: May 5, 2026

(54) COMPUTING APPARATUS FOR PROOF OF WORK, AND ASIC CHIP AND COMPUTING METHOD FOR PROOF OF WORK

(71) Applicant: BITMAIN TECHNOLOGIES INC., Beijing (CN)

(72) Inventors: Xufeng Wu, Beijing (CN); Cunyong Yang, Beijing (CN); Ketuan Zhan, Beijing (CN)

(73) Assignee: BITMAIN TECHNOLOGIES INC., Beijing (CN)

( * ) Notice: Subject to any disclaimer, the term of this patent is extended or adjusted under 35 U.S.C. 154(b) by 260 days.

(21) Appl. No.: 18/234,303

(22) Filed: Aug. 15, 2023

(65) Prior Publication Data

US 2023/0388137 A1 Nov. 30, 2023

Related U.S. Application Data

(63) Continuation of application No. PCT/CN2022/071658, filed on Jan. 12, 2022.

(30) Foreign Application Priority Data

Feb. 20, 2021 (CN) .......................... 202110196725.2

(51) Int. Cl.
| | |
|---|---|
| *H04L 9/00* | (2022.01) |
| *G06F 16/2458* | (2019.01) |
| *H04L 9/32* | (2006.01) |

(52) U.S. Cl.
CPC .............. *H04L 9/50* (2022.05); *H04L 9/3218* (2013.01); *G06F 16/2465* (2019.01); *G06F 2216/03* (2013.01); *H04L 2209/30* (2013.01)

(58) Field of Classification Search
CPC ............. G06F 16/2465; G06F 2216/03; H04L 2209/30
See application file for complete search history.

(56) References Cited

U.S. PATENT DOCUMENTS

| | | | | |
|---|---|---|---|---|
| 10,142,098 B2 * | 11/2018 | Suresh | .................. | H04L 9/0643 |
| 11,770,256 B1 * | 9/2023 | Carlson | ................. | H04L 9/0662 |

(Continued)

FOREIGN PATENT DOCUMENTS

| | | |
|---|---|---|
| CN | 105245327 A | 1/2016 |
| CN | 106415530 A | 2/2017 |

(Continued)

OTHER PUBLICATIONS

Hanke, Timo, "AsicBoost—A Speedup for Bitcoin Mining", https://arxiv.org/ftp/arxiv/papers/1604/1604.00575.pdf, Published: Mar. 31, 2016. (Year: 2016).*

(Continued)

*Primary Examiner* — Nam T Tran
(74) *Attorney, Agent, or Firm* — MASCHOFF BRENNAN; Liang Huang

(57) ABSTRACT

A computing apparatus and method for proof of work, and a chip are provided. The computing apparatus includes: N selectors, respectively configured to obtain N groups of first input quantities; and N first compressors, respectively connected to the N selectors, and respectively configured to receive the N groups of first input quantities sent by the N selectors, and to receive a same second input quantity, wherein each first compressor is configured to sequentially perform compression processing on the second input quantity and each first input quantity in one group of first input quantities, and compression processing results of the N first compressors each is used to obtain a proof-of-work result.

16 Claims, 6 Drawing Sheets

(56)　　　　　　References Cited

U.S. PATENT DOCUMENTS

2016/0125040　A1　　5/2016　Kheterpal et al.
2017/0243176　A1*　8/2017　Hanke ................... H04L 9/0643

FOREIGN PATENT DOCUMENTS

CN　　　　110557261　A　　12/2019
CN　　　　112003603　A　　11/2020
CN　　　　112925504　A　　　6/2021

OTHER PUBLICATIONS

Rahul P. Naik, "Optimising the SHA256 Hashing Algorithm for Faster and More Efficient Bitcoin Mining," https://api.semanticscholar. org/CorpusID:35315296, Sep. 2, 2013, 65 pages.
Dr. Timo Hanke, AsicBoost—A Speedup for Bitcoin Mining, https:// arxiv.org/abs/1604.00575, Mar. 31, 2016, 10 pages.

* cited by examiner

Block header

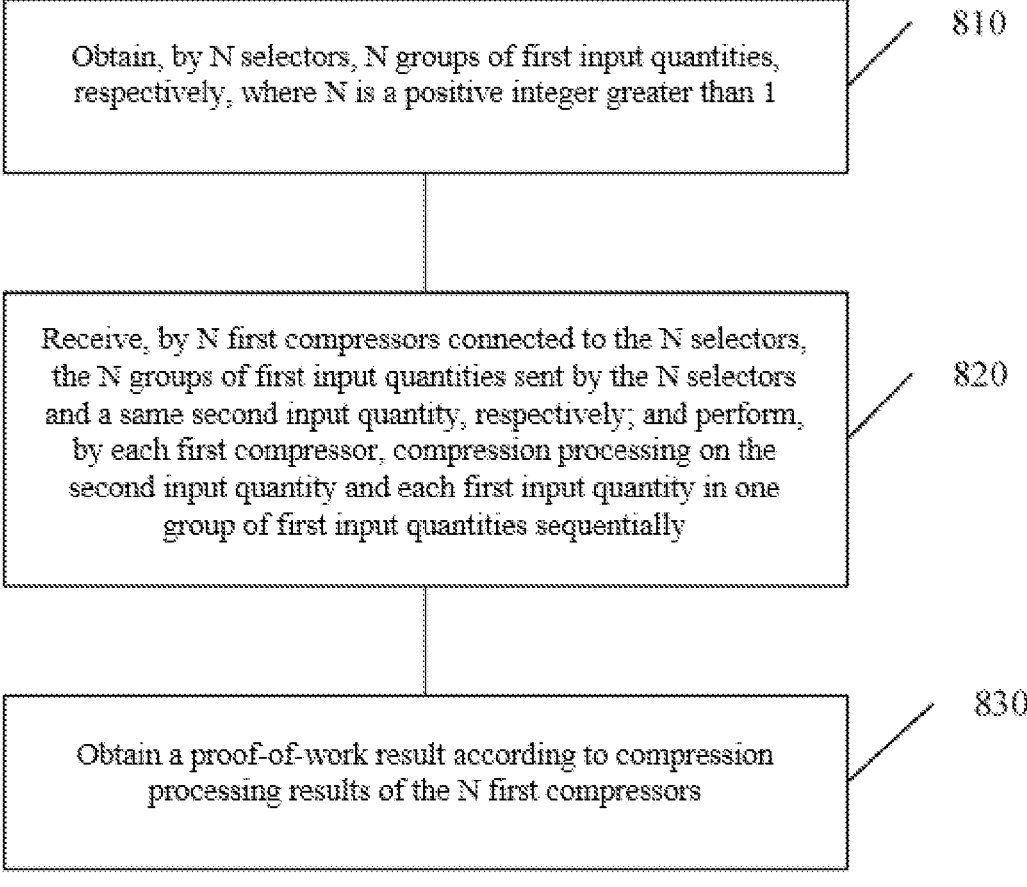

Obtain, by N selectors, N groups of first input quantities, respectively, where N is a positive integer greater than 1 — 810

Receive, by N first compressors connected to the N selectors, the N groups of first input quantities sent by the N selectors and a same second input quantity, respectively; and perform, by each first compressor, compression processing on the second input quantity and each first input quantity in one group of first input quantities sequentially — 820

Obtain a proof-of-work result according to compression processing results of the N first compressors — 830

COMPUTING APPARATUS FOR PROOF OF WORK, AND ASIC CHIP AND COMPUTING METHOD FOR PROOF OF WORK

CROSS-REFERENCE TO RELATED APPLICATION

The present application is a U.S. continuation under 35 U.S.C. § 111(a) of International Application No. PCT/CN2022/071658 filed on Jan. 12, 2022, which claims priority to Chinese Patent Application No. 202110196725.2, filed with the China National Intellectual Property Administration on Feb. 20, 2021, and entitled "COMPUTING APPARATUS FOR PROOF OF WORK, ASIC CHIP, AND COMPUTING METHOD FOR PROOF OF WORK". The contents of these applications are incorporated herein by reference in their entirety for all purposes.

TECHNICAL FIELD

The present disclosure relates to the field of data processing.

BACKGROUND

A proof-of-work process is a process of finding a nonce that meets a condition within a specific range through a large amount of computing, and its nature is to "solve" a current block through competition. A node that solves the block first may gain a corresponding reward. Therefore, how to improve the computing efficiency of proof of work becomes an urgent problem to be solved.

SUMMARY

Embodiments of the present application provide a computing apparatus for proof of work, an ASIC chip, and a computing method for proof of work.

According to an aspect, an embodiment of the present application provides a computing apparatus for proof of work. The computing apparatus includes N selectors, respectively configured to obtain N groups of first input quantities, wherein N is a positive integer greater than 1; and N first compressors, respectively connected to the N selectors, and respectively configured to receive the N groups of first input quantities sent by the N selectors, and to receive a same second input quantity, wherein each first compressor is configured to sequentially perform compression processing on the second input quantity and each first input quantity in one group of first input quantities, and compression processing results of the N first compressors each are used to obtain a proof-of-work result.

According to another aspect, an embodiment of the present application provides a chip. The chip includes the computing apparatus in the above aspect.

According to yet another aspect, an embodiment of the present application provides a computing method for proof of work. The computing method includes obtaining, by N selectors, N groups of first input quantities, respectively, where N is a positive integer greater than 1;

receiving, by N first compressors connected to the N selectors, the N groups of first input quantities sent by the N selectors and a same second input quantity, respectively, and performing, by each first compressor, compression processing on the second input quantity and each first input quantity in one group of first input quantities sequentially; and obtaining a proof-of-work result according to compression processing results of the N first compressors.

BRIEF DESCRIPTION OF THE DRAWINGS

FIG. 8 is a schematic flowchart of a computing method for proof of work according to an embodiment of the present application.

DETAILED DESCRIPTION OF EMBODIMENTS

The technical solutions of the present application will be described below with reference to the accompanying drawings.

To better understand the embodiments of the present application, the principle of proof of work is first described.

A proof-of-work process may also be referred to as a "mining" process, the core of which is to perform a large amount of computing using a plurality of computing platforms (also referred to as "mining machines"), to find a nonce that meets a condition within a specific range. The nature of the process is to "solve" a current block through competition. A new reward is generated each time a block is solved, and can be gained only by a node that solves the block first. Each block contains one record, and an address in the record is an address that is qualified to gain the reward. This record is referred to as a production transaction.

In a network, data is permanently recorded in the form of files, which are referred to as blocks. One block is a set of records for some or all of the latest production transactions, for example, all transactions within ten minutes that are not recorded in another previous block. Each block records all events that occurred before the block is created. As shown in Table 1, the block usually includes a magic number (Magic No), a block size (Block Size), a block header (Block Header), a transaction counter (TransactionCounter), and transactions (Transactions).

TABLE 1

| Block | | | | |
| --- | --- | --- | --- | --- |
| Magic number | Block size | Block header | Transaction counter | Transactions |
| 4 bytes | 4 bytes | 80 bytes | 1 to 9 bytes | Variable |

Figures 1, 2:
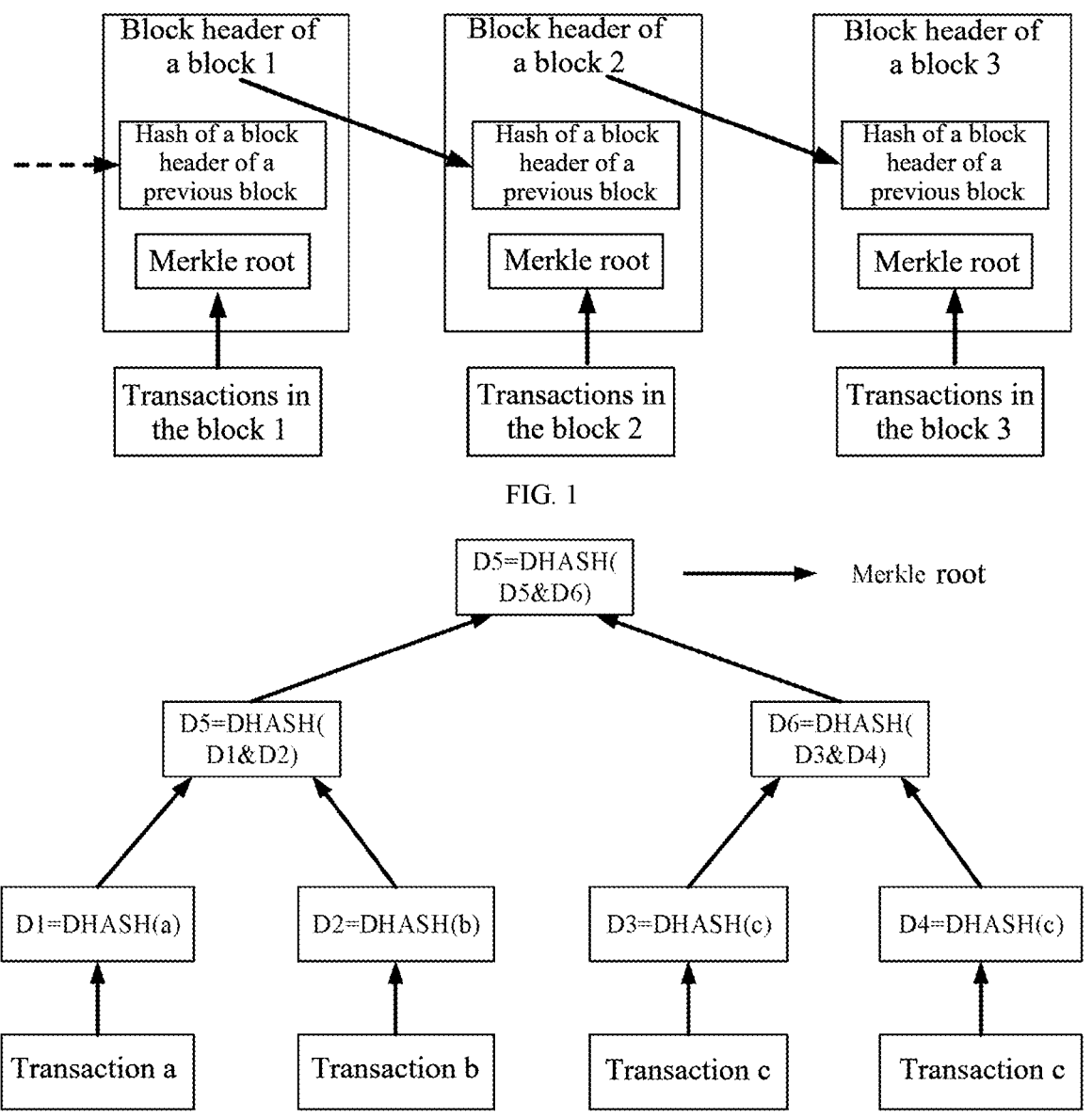
FIG. 1 is a schematic diagram of a blockchain.
FIG. 2 is a schematic diagram of a Merkle Tree.

As shown in FIG. 1, a block header of each block includes a hash (HASH) value of a previous block, such that a chain of blocks from a genesis block to a current block is formed, with each block necessarily following a previous block in a chronological order. The chain is referred to as a block-chain (Block Chain).

In the block shown in Table 1, the block header occupies 80 bytes. In the proof-of-work process, a message to be hashed is the block header. As shown in Table 2, one block header may be divided into the following two chunks, a chunk 2 of which is padded to a length of 64 bytes. A chunk 1 (Chunk1) includes a version number, a hash value of a previous block, and a head of a hash value of a Merkle root node. The chunk 2 (Chunk2) includes a tail of the hash value of the Merkle root node, a timestamp, a difficulty value, a nonce, and a padding portion. The chunk 1 is referred to as a mid-state, and the tail of the hash value of the Merkle root node, the timestamp, and the difficulty value in the chunk 2 are referred to as a message.

acter, a 256-bit character string is output based on the SHA-256 algorithm. Data encrypted based on the SHA-256 greatly differs from the original data, making it extremely difficult to crack.

A block header with a fixed length of 80 bytes is an input character string used for proof of work. Therefore, in order to enable a block header to reflect transactions contained in a block, in a construction process of the block, for a transaction list to be included in the block, a hash value of a Merkle root node needs to be generated based on a Merkle Tree algorithm, and is stored in the block header as a digest of the transaction list. A Merkle Tree is essentially a hash binary tree. Double SHA-256 is used for a Merkle Tree in

TABLE 2

| Chunk 1 (64 bytes) | | | Chunk 2 (64 bytes) | | | | |
| --- | --- | --- | --- | --- | --- | --- | --- |
| Block header (80 bytes) | | | | | | | |
| Block header candidate | | | | | | | |
| Hash value of a | Hash value of a Merkle root node | | | | | | |
| Version | previous block | Head | Tail | Timestamp | Difficulty | Nonce | Padding |
| 4 bytes | 32 bytes Mid-state | 28 bytes | 4 bytes | 4 bytes Message | 4 bytes | 4 bytes | 48 bytes |

Version: a regional version number, which includes 4 bytes and is updated at a low frequency in a computing process.

Hash value of the previous block (Previous Hash): 32-byte data, which includes transaction information of all previous blocks, and forms the core of the blockchain. The hash value of the previous block is updated at a low frequency, for example, every ten minutes, in the computing process.

Head of the Merkle root node (Merkle Root Head): 28-byte data. The 28-byte data and the 4-byte data of the tail of the Merkle root node (Merkle Root Tail) form a total of 32-byte data, that is, a 256-bit hash value based on all transactions in a block. The head of the Merkle root node is updated at a low frequency in the computing process. For example, there are tens to thousands of transactions per ten minutes.

Tail of the Merkle root node: 4-byte data. The 4-byte data and the 28-byte data of the head of the Merkle root node form a total of 32-byte data, that is, a 256-bit hash value based on all transactions in a block. The tail of the Merkle root node is updated at a low frequency in the chip computing process. For example, there are tens to thousands of transactions per ten minutes. The 32-byte Merkle root includes all the transaction information of the current block.

Timestamp: 4-byte data. The timestamp is updated at a low frequency in the computing process.

Difficulty: 4-byte data, which is a target hash value in a current compression format, and is also referred to as a target bit compression value. The difficulty is updated at a low frequency in the computing process.

Nonce: 4-byte data, which is 32-bit data starting from 0. There is a total of $2^{32}$ nonces. In the proof-of-work process, the entire range of nonces is traversed to find a nonce that meets a condition. Therefore, the nonce is updated at a high frequency in the computing process.

Padding: 48-byte data, which is a constant.

A proof-of-work function used in the proof-of-work process is a secure hash algorithm (SHA)-256. For any char- Bitcoin. That is, another SHA-256 is performed again after one SHA-256 is performed on data of each transaction. For example, assuming that a block includes three transactions a, b, and c, an algorithm illustration of a Merkle Tree for the three transactions may be shown in FIG. 2.

The proof-of-work process is in fact a process of continuously computing a hash value using an application-specific integrated circuit (ASIC). The final result is to find a HASH 256 value, which is encrypted based on double SHA-256, and is compared with a target bit value. If the computed value is less than the target bit, that is, the number of zeros in the front of the value of the computed result is less than that of zeros in the front of the target bit value, the result is broadcast to the entire network, to announce that a new block is found. In other words, the block can be accepted by the network only when the HASH value of the block header that meets the condition is less than or equal to the target bit value.

The lower the target bit value, the more difficult it is to generate a new block. A nonce value, as the only quantity varying at a high frequency, is sent to the system for SHA-256 computing. The computing process is a process of traversing all nonce values within a specific range and finally finding a nonce value that makes the computed result less than the target bit value.

Figure 5:
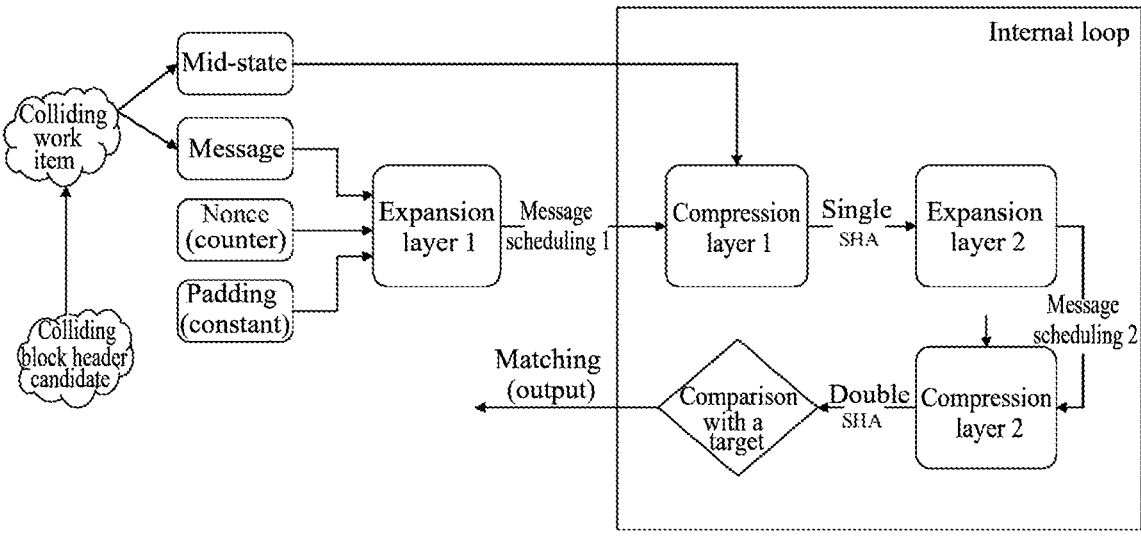
FIG. 5 is a schematic diagram of a loop in an ASIC-BOOST-based computing process of proof of work.

A computing method of finding a nonce value is described below with reference to FIG. 3 to FIG. 5.

Figures 3, 4:
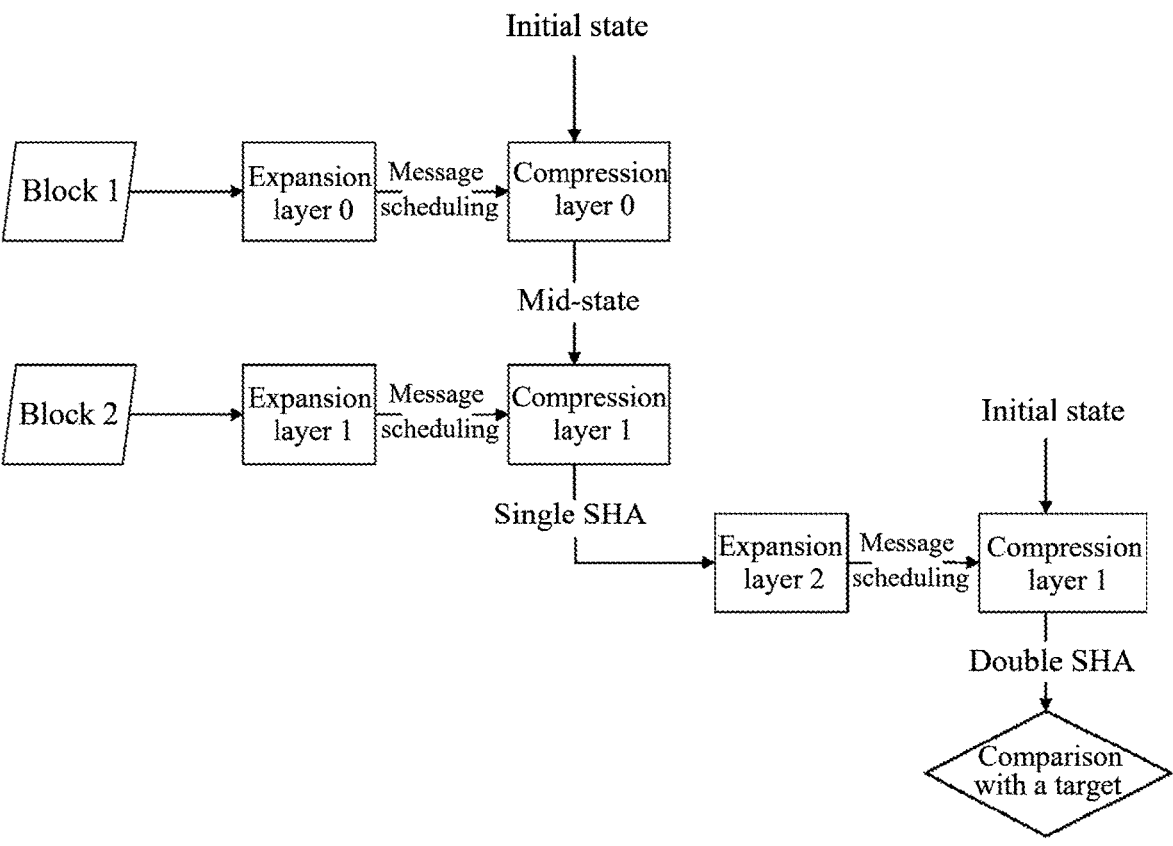
FIG. 3 is a schematic diagram of a computing process of proof of work.
FIG. 4 is a schematic diagram of a loop in a conventional computing process of proof of work.

In a proof-of-work algorithm function, a processing process of 80-byte data in a block header of a block is shown in FIG. 3. In step 1, a mid-state is 64-byte data output after the first 64-byte data in the 80 bytes of the block header passes through an expansion layer 0 and a compression layer 0, and the mid-state is used as a first input to a compression layer 1 (that is, an input 1 of the compression layer 1). The mid-state is input to the compression layer 1 as less-frequently varying data.

In step 2, a total of 64-byte data formed by adding the last 16 bytes in the 80 bytes of the block header to the padding 48 bytes is expanded at the expansion layer 1 to 64 pieces of 4-byte data, namely, 256-byte data, and the data is used as another input to the compression layer 1 (that is, an input 2 of the compression layer 1).

In step 3, the 256 bytes (that is, the input 2 of the compression layer 1) are compressed into 64 bytes through 64 rounds of compression at the compression layer 1, with 4 bytes being compressed each round. A concatenation operation is performed on the 64-byte data of the mid-state (that is, the input 1 of the compression layer 1) and the 64-byte data obtained after the 64 rounds of compression, and a result (that is, an output of the compression layer 1) obtained after the concatenation operation is SHA-256 encrypted for the first time.

In step 4, one piece of 64-byte data is output after the 64-byte result that is SHA-256 encrypted for the first time and output by the compression layer 1 passes through an expansion layer 2 and a compression layer 2, and the piece of 64-byte data is SHA-256 computed for the second time. A computed result, which is a final result, is compared with a target bit value. If the computed result is less than the target bit value, the condition is met, a new block is generated, and a nonce value that meets the condition is output.

Finally, an obtained output result is stored in a next block as a block header hash value of the next block, to form a blockchain.

The computing method shown in FIG. 3 is performed in an internal loop, and a nonce value is traversed in the loop. As shown in FIG. 4, a work item includes a mid-state (64 bytes) and a message (12 bytes). The work item is precomputed and transmitted from the outside to an ASIC chip. That is, the work item does not participate in an internal mining loop, and may be considered as a constant in a proof-of-work process. Although the work item varies at a low frequency, such a low-frequency update is much lower than a high-frequency update with which the nonce value is traversed.

In fact, in the entire computing process, only the nonce value is updated at a high frequency and participates in the internal loop. In addition, there is a case that no matching hash value can be found even after 2^32 values are all traversed. In this case, extra nonce (Extrallonce) bits are further generated, to continue to be traversed.

The proof-of-work process is a process of continuously traversing the nonce value.

However, in the internal loop shown in FIG. 4, the four layers, namely, the expansion layer 1, the compression layer 1, the expansion layer 2, and the compression layer 2, all need to participate in the internal loop. Each time a mid-state is input from the outside to the compression layer 1, a plurality of nonce values need to be traversed in the internal loop. Therefore, a computing amount for traversing the nonce value is significantly large.

Therefore, an ASIC-BOOST algorithm is proposed. As shown in FIG. 5, in ASIC-BOOST, a 12-byte message in a work item becomes a constant through a series of data collisions. That is, block header candidates of a plurality of block headers share a same message. In this case, the message is input to the expansion layer 1 in the form of a constant. All mid-states instead of all nonce values are traversed in an internal loop of ASIC-BOOST. The nonce value is updated in an external loop rather than in the internal loop. That is, in ASIC-BOOST, the nonce value switches from the internal loop to the external loop, and the mid-state switches from the external loop to the internal loop.

The mid-state is directly an input to the compression layer 1, skipping the expansion layer 1. Therefore, only the compression layer 1, the expansion layer 2, and the compression layer 3 participate in the internal loop of ASIC-BOOST, altogether only three layers participating in the loop in total. In FIG. 3, four layers participate in the internal loop. Because all functions at the four layers have a similar complexity, 25% of an overall computing amount can be reduced by ASIC-BOOST. Assuming that the expansion layer 1 occupies X percent of a total of the four functions, there is a total gain of $X(n-1)/n$ percent when there are n colliding work items.

The present application provides a computing apparatus for proof of work, to further improve the computing efficiency of proof of work based on ASIC-BOOST.

Figure 6:
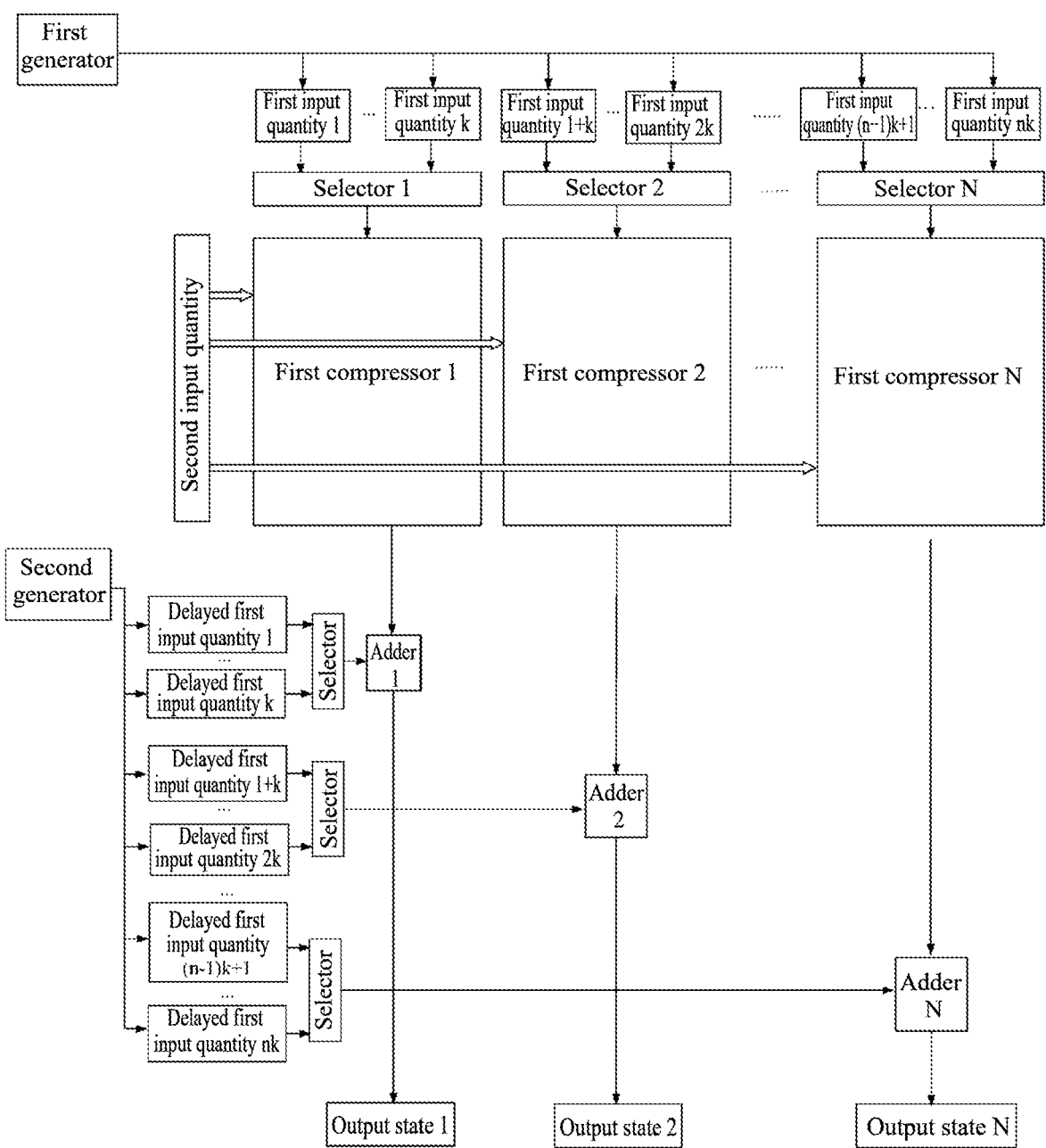
FIG. 6 is a schematic diagram of a computing apparatus for proof of work according to an embodiment of the present application.

FIG. 6 is a schematic block diagram of a computing apparatus for proof of work according to an embodiment of the present application. As shown in FIG. 6, the computing apparatus includes N selectors and N first compressors connected to the N selectors.

The N selectors are respectively configured to obtain N groups of first input quantities.

The N first compressors are respectively configured to receive the N groups of first input quantities sent by the N selectors, and to receive a same second input quantity. Each first compressor is configured to sequentially perform compression processing on the second input quantity and each first input quantity in one group of first input quantities, and compression processing results of the N first compressors each are used to obtain a proof-of-work result.

For example, the second input quantity includes a message field of a block header, and the message field includes at least one of the following information: last 32 bits of a hash Merkle root, a timestamp, a difficulty, a nonce, and a padding bit. That is, the second input quantity is the "message" in Table 2 above.

For example, the first input quantity includes a mid-state field of the block header, and the mid-state field includes at least one of the following information: a version number, a hash value of a previous block, and first 224 bits of the hash Merkle root. That is, the first input quantity is the "mid-state" in Table 2 above.

As shown in FIG. 6, each of the N groups of first input quantities includes k first input quantities. For example, a first group includes a first input quantity 1 to a first input quantity k, a second group includes a first input quantity 1+k to a first input quantity 2 k, . . . , and an $N^{th}$ group includes a first input quantity $(n-1)k+1$ to a first input quantity nk. Hash Merkle roots corresponding to k first input quantities belonging to a same group have the same last 32 bits.

A first compressor 1 in FIG. 6 is taken as an example. The first compressor 1 includes two parts of inputs, one part being the k first input quantities, and the other part being the second input quantity. The second input quantity is updated at a low frequency, and is updated once every k periods. The first compressor 1 sequentially performs compression processing on the same second input quantity and a first input quantity 1 to a first input quantity k that are different, to obtain a compression processing result. A proof-of-work result may be obtained after subsequent processing of the compression processing result. It can be understood that, in some implementations, the number k of first input quantities included in each group of first input quantities may alternatively be 1. In this case, the selector 1 to the selector N are not required. The first compressor 1 performs compression processing on the second input quantity and the first input quantity 1, to obtain a compression result.

It can be seen that, when the number k of first input quantities included in each group of first input quantities is not 1, a same compressor is reused, through a selector, for k first input quantities belonging to a same group, reducing a computing amount of the second input quantity, thereby reducing a logic operation amount in a computing process of proof of work, improving the computing efficiency, reducing the number of compressors, and reducing a chip area and power consumption.

In an implementation, the computing apparatus further includes N adders. The N adders are respectively connected to the N first compressors. Each adder is configured to perform addition processing on a compression processing result of a first compressor corresponding to the adder and a group of delayed first input quantities corresponding to the first compressor.

The first compressor 1 in FIG. 6 is still taken as an example. After sequentially performing compression processing on the second input quantity and the first input quantity 1 to the first input quantity k, the first compressor 1 inputs a compression processing result to an adder 1. Meanwhile, the adder 1 receives a delayed first input quantity 1 to a delayed first input quantity k, and performs addition processing on the group of first input quantities and the group of delayed first input quantities, to obtain an output state 1. It can be understood that, when the value of k is 1, a selector connected to an adder is not required. The first compressor 1 is taken as an example. After performing compression processing on the second input quantity and the first input quantity 1, the first compressor 1 inputs the compression processing result to the adder 1. Meanwhile, the adder 1 receives the delayed first input quantity 1, and performs addition processing on the group of first input quantities and the group of delayed first input quantities, to obtain the output state 1.

Figure 7:
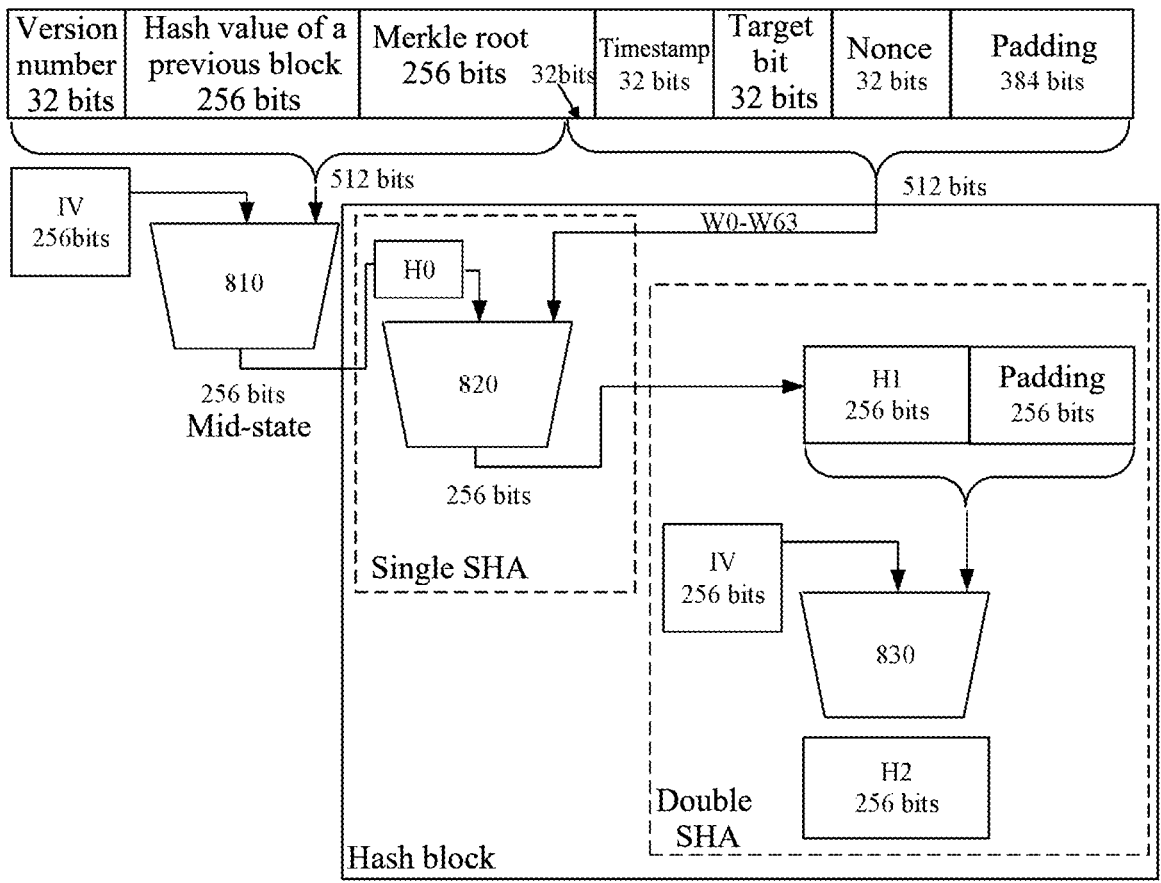
FIG. 7 is a schematic diagram of a computing principle for proof of work according to an embodiment of the present application.

To understand the computing process involved in this embodiment more clearly, a SHA-256 algorithm is briefly described below with reference to FIG. 7.

In step 1, a parameter $\{W_t\}$ for message scheduling is prepared.

$$W_t = \begin{cases} M_t & 0 \le t \le 15 \\ \sigma_1^{\{256\}}(W_{t-2}) + W_{t-7} + \sigma_0^{\{256\}}(W_{t-15}) + W_{t-16} & 16 \le t \le 63 \end{cases}$$

The value of t ranges from 0 to 63, and corresponding $W_0$ to $W_{63}$ may be respectively obtained. $W_0$ to $W_{63}$ may be used as the second input quantity shown in FIG. 6.

In step 2, eight working variables, namely, a, b, c, d, e, f, g, and h, are initialized, and a hash value obtained in the $(i-1)^{th}$ computing is used. a, b, c, d, e, f, g, and h may be used as a group of first input quantities in FIG. 6.

$$a = H_0^{(i-1)}$$
$$b = H_1^{(i-1)}$$
$$c = H_2^{(i-1)}$$
$$d = H_3^{(i-1)}$$
$$e = H_4^{(i-1)}$$
$$f = H_5^{(i-1)}$$
$$g = H_6^{(i-1)}$$

-continued
$$h = H_7^{(i-1)}.$$

In step 3, each working variable is updated based on t=0 to t=63.

$$T_1 = h + \sum_1^{\{256\}}(e) + Ch(e, f, g) + K_t^{\{256\}} + W_t$$
$$T_2 = \sum_0^{\{256\}}(a) + Maj(a, b, c)$$
$$h = g$$
$$g = f$$
$$f = e$$
$$e = d + T_1$$
$$d = c$$
$$c = b$$
$$b = a$$
$$a = T_1 + T_2.$$

In step 4, an $i^{th}$ hash value $H^{(i)}$ is computed.

$$H_0^i = a + H_0^{(i-1)}$$
$$H_1^i = b + H_1^{(i-1)}$$
$$H_2^i = c + H_1^{(i-1)}$$
$$H_3^i = d + H_1^{(i-1)}$$
$$H_4^i = e + H_1^{(i-1)}$$
$$H_5^i = f + H_1^{(i-1)}$$
$$H_6^i = g + H_1^{(i-1)}$$
$$H_7^i = h + H_1^{(i-1)}$$

It can be learned from the process that, a computing result of the $i^{th}$ SHA-256 may be obtained after compression processing and addition processing.

In FIG. 6, if t=0 to t=63 are used as 64 computing periods, there is a gap of 64 computing periods between a first input quantity that passes through the first compressor and a delayed first input quantity. Therefore, the first input quantity needs to be delayed, and the first input quantity and the delayed first input quantity are input to the adder for addition processing.

In an implementation, the N groups of first input quantities and the N groups of delayed first input quantities are generated by different mid-state generators. That is, first input quantities with a gap of 64 computing periods are separately generated using different generators. For example, the N groups of first input quantities are generated by a first generator; and the N groups of delayed first input quantities are generated by a second generator. As shown in FIG. 6, after generating the N groups of delayed first input quantities, the second generator respectively inputs the N groups of delayed first input quantities to the respective adders using additional N selectors.

Because the second generator uses a serial hash operation logic, a circuit of the second generator is very small. Compared with a separate delay apparatus such as delay first in first out (First In First Out, FIFO), a larger chip area and power consumption are reduced.

Locations of the first generator and the second generator are not limited in the embodiments of the present application. For example, the first generator, the second generator, and the N compressors may be integrated on a same ASIC chip. For another example, the N compressors are disposed on an ASIC chip, while the first generator and the second generator are disposed on a control board.

A plurality of ASIC chips having a same structure may be disposed on a same circuit board, and the circuit board may be referred to as a computing power board. The control board is an independent component on the computing apparatus for proof of work. For example, the control board may be an FPGA or ASIC circuit, and is mainly responsible for receiving a computing task from the outside and allocating a computing task to each computing power board, and responsible for returning a computing result.

The first generator and the second generator are disposed on the control board, and ASIC chips on a plurality of computing power boards share a same first generator and a same second generator, so that an area and power consumption of the ASIC chip can be reduced.

Values of N and k are not limited in the embodiments of the present application. For example, the number k of first input quantities included in each group of first input quantities may be 4 or 8. It can be understood that, the number k of first input quantities included in each group of first input quantities may alternatively be 1. This is not limited herein. For another example, the number N of first compressors included in the computing apparatus meets $2 \leq N \leq 64$. In one example, the number N of first compressors included in the computing apparatus meets $2 \leq N \leq 16$.

It can be seen from the foregoing description that, in a process of traversing the first input quantities, a key to keep the second input quantity unchanged is to search for candidate Merkle roots with the same last 4 bytes. The way of generating different first input quantities is not limited in the embodiments of the present application.

For example, extra nonces may be added, to obtain different first input quantities. That is, the extra nonces may be added to the first transaction of each block. In some embodiments, an extra nonce byte may be added to a left subnode of a binary tree shown in FIG. 2.

For another example, a Merkle Tree may be reconstructed by exchanging a transaction order, that is, exchanging subnodes of the binary tree, to obtain different first input quantities.

For another example, different first input quantities may be generated according to different version numbers in the block header. In other words, each group of first input quantities in FIG. 6 is generated by the first generator according to different version numbers in the block header, and each group of delayed first input quantities is generated by the second generator according to the different version numbers in the block header.

Three times of hash computing are performed in the computing process of proof of work. For example, as shown in FIGS. 8, 810, 820, and 830 respectively represent three times of hash computing. In the first time of hash computing, that is, 810, expansion processing and compression processing are performed on a mid-state (512 bits) in the block header, to obtain a processed mid-state, that is, a first input quantity. In the second time of hash computing, that is, 820, expansion processing is performed on a message (512 bits) in the block header, to obtain a second input quantity, and compression processing is performed on the first input quantity and the second input quantity. In the third time of hash computing, that is, 830, expansion processing and compression processing are performed on a processing result in 820, to obtain a final proof-of-work result.

The foregoing computing process shown in FIG. 6 involves the second time of hash computing. In other words, in this embodiment of the present application, the second time of hash computing, in particular, a compression processing process, is improved, thereby improving the computing efficiency of proof of work.

Therefore, in an implementation, the computing apparatus for proof of work in this embodiment of the present application may further include a first expander.

The first expander is configured to perform expansion processing on the mid-state field (including the last 32 bits of the hash Merkle root, the timestamp, the difficulty, the nonce, and the padding bit.) in the block header, to obtain the second input quantity.

In an implementation, the computing apparatus may further include N second expanders and N second compressors connected to the N second expanders. The N second expanders and the N second compressors are configured to perform the first time of hash computing in the computing process of proof of work.

In some embodiments, the N second expanders are respectively configured to perform expansion processing on N candidate values of the message field (that is, the version number, the hash value of the previous block, and the first 224 bits of the hash Merkle root) in the block header. The N second compressors are respectively configured to perform compression processing on expansion processing results of the N candidate values of the message field in the block header, to obtain the N groups of first input quantities.

In an implementation, the computing apparatus may further include N third expanders connected to the N adders and N third compressors connected to the N third expanders. The N third expanders and the N third compressors are configured to perform the third time of hash computing in the computing process of proof of work.

In some embodiments, the N third expanders are respectively configured to perform expansion processing on the addition processing results of the N adders; and the N third compressors are respectively configured to perform compression processing on expansion processing results of the N third expanders, to obtain the proof-of-work result.

A proof-of-work result corresponding to each first input quantity is compared with a target bit value of a current network. When the proof-of-work result is less than the target bit value, it indicates that a current block is solved.

An embodiment of the present application further provides a chip. The chip includes the computing apparatus for proof of work in any one of the above embodiments. The chip may be a computing power chip, and a plurality of computing power chips having a same structure are disposed on a same circuit board.

It should be understood that for a conventional computer, only one computing processor chip, for example, a central processing unit (CPU) or a graphic processing unit (GPU), etc. is disposed on one printed circuit board (PCB). For a product employing an ASIC chip, a plurality of computing power processor chips (that is, ASIC chips) having a same structure are usually densely placed on one PCB (referred to as a computing power board). In addition, in these ASIC chips, at least two ASIC chips are connected in series.

As shown in FIG. 8, an embodiment of the present application further provides a computing method for proof of work. The method includes the following steps.

810: Obtain, by N selectors, N groups of first input quantities, respectively, where N is a positive integer greater than 1.

820: Receive, by N first compressors connected to the N selectors, the N groups of first input quantities sent by the N selectors and a same second input quantity, respectively; and perform, by each first compressor, compression processing on the second input quantity and each first input quantity in one group of first input quantities sequentially.

830: Obtain a proof-of-work result according to compression processing results of the N first compressors.

Therefore, the same compressor is reused for the plurality of first input quantities through the selector, thereby reducing a computing amount of the second input quantity. That is, each compressor computes the second input quantity once every multiple periods, thereby reducing a logic operation amount in a computing process of proof of work, improving the computing efficiency of proof of work, reducing the number of compressors, and reducing a chip area and power consumption.

In an implementation, the computing method further includes: performing, by each of N adders connected to the N first compressors, addition processing on a compression processing result of a respective first compressor and a group of delayed first input quantities corresponding to the first compressor.

In an implementation, the N groups of first input quantities are generated by a first generator; and N groups of delayed first input quantities are generated by a second generator.

In an implementation, the N groups of delayed first input quantities are input to their corresponding adders by additional N selectors, respectively.

In an implementation, each group of first input quantities is generated by the first generator according to different version numbers in a block header, and each group of delayed first input quantities is generated by the second generator according to the different version numbers in the block header.

In an implementation, the first generator, the second generator, and the N compressors are integrated on a same ASIC chip.

In an implementation, the N compressors are disposed on an ASIC chip, and the first generator and the second generator are disposed on a control board.

In an implementation, the ASIC chip performs proof-of-work computing based on a SHA-256 algorithm.

In an implementation, a number of first input quantities included in each group of first input quantities is 8.

In an implementation, $2 \leq N \leq 16$.

In an implementation, the second input quantity includes a mid-state field of the block header, and the mid-state field includes at least one of the following information: last 32 bits of a hash Merkle root, a timestamp, a difficulty, a nonce, and a padding bit.

In an implementation, the computing method further includes: performing, by a first expander, expansion processing on the mid-state field using, to obtain the second input quantity.

In an implementation, the first input quantity includes a message field of the block header, and the message field includes at least one of the following information: a version number, a hash value of a previous block, and first 224 bits of a hash Merkle root.

In an implementation, before the obtaining, by N selectors, N first input quantities, respectively, the computing method further includes: performing, by N second expanders, expansion processing on N candidate values of the message field, respectively; and performing, by N second compressors connected to the N second expanders, compression processing on expansion processing results of the N candidate values of the message field, respectively, to obtain the N groups of first input quantities.

In an implementation, the obtaining a proof-of-work result according to compression processing results of the N compressors includes: performing, by N third expanders connected to the N adders, expansion processing on addition processing results of the N adders; and performing, by N third compressors connected to the N third expanders, compression processing on expansion processing results of the N third expanders, respectively, to obtain the proof-of-work result.

In an implementation, the computing method is performed by an ASIC chip, and ASIC chips having a same structure are disposed on a same circuit board.

In an implementation, the ASIC chip performs proof-of-work computing based on a SHA-256 algorithm.

It should be understood that the method shown in FIG. 8 may be performed by the computing apparatus shown in FIG. 6. For the detailed description of the features in the method embodiments, refer to the description of the apparatus side. For brevity, details are not described herein again.

It should be noted that, without a conflict, the embodiments described in the present application and the technical features in the embodiments may be randomly combined, and a technical solution obtained after combination also falls within the scope of protection of the present application.

It should be understood that a specific example in the embodiments of the present application is merely to help a person skilled in the art better understand the embodiments of the present application, rather than limiting the scope of the embodiments of the present application. A person skilled in the art may make various improvements and variations on the basis of the above embodiments, and the improvements or variations fall within the scope of protection of the present application.

The descriptions are merely specific implementations of the present application, but are not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

What is claimed is:

1. A computing apparatus for proof of work, comprising:
N selectors, respectively configured to obtain N groups of first input quantities, wherein N is a positive integer greater than 1, wherein each of the N groups of first input quantities includes k first input quantities, k is a positive integer greater than 1;
N first compressors, respectively connected to the N selectors, and respectively configured to receive the N groups of first input quantities sent by the N selectors, and to receive a same second input quantity, wherein each of the N first compressors is configured to perform compression processing on the second input quantity and the first input quantities in a respective one of the N groups of first input quantities sequentially, and compression processing results of the N first compressors each is used to obtain a proof-of-work result; and
N adders, respectively connected to the N first compressors, wherein each of the N adders is configured to perform addition processing on a compression process-
ing result of a respective first compressor of the N first
compressors and a group of delayed first input quanti-
ties corresponding to the respective first compressor,
wherein the N groups of first input quantities are
generated by a first generator, and N groups of delayed
first input quantities are generated by a second genera-
tor, the first generator and the second generator are
different mid-state generators,
wherein the N selectors, the N first compressors and the
N adders are disposed on an ASIC chip disposed on a
computing power board, the first generator and the
second generator are disposed on a control board.

2. The computing apparatus according to claim 1, wherein
the N groups of delayed first input quantities are input to
their corresponding adders by additional N selectors, respec-
tively.

3. The computing apparatus according to claim 1, wherein
each group of first input quantities is generated by the first
generator according to different version numbers in a block
header, and each group of delayed first input quantities is
generated by the second generator according to the different
version numbers in the block header.

4. The computing apparatus according to claim 1, wherein
the second input quantity comprises a message field of a
block header, and the message field comprises at least one of
the following:
   last 32 bits of a hash Merkle root, a timestamp, a difficulty,
   a nonce, or a padding bit.

5. The computing apparatus according to claim 4, further
comprising:
   a first expander, configured to perform expansion pro-
   cessing on a mid-state field, to obtain the second input
   quantity, wherein the first expander is disposed on an
   ASIC (Application Specific Integrated Circuits) chip.

6. The computing apparatus according to claim 1, wherein
the first input quantity comprises a mid-state field of a block
header, and the mid-state field comprises at least one of the
following:
   a version number, a hash value of a previous block, or first
   224 bits of a hash Merkle root.

7. The computing apparatus according to claim 6, further
comprising:
   N second expanders, respectively configured to perform
   expansion processing on N candidate values of the
   message field, wherein the N second expanders are
   disposed on an ASIC chip disposed on the computing
   power board; and
   N second compressors, respectively connected to the N
   second expanders, and respectively configured to per-
   form compression processing on expansion processing
   results of the N candidate values of the message field,
   to obtain the N groups of first input quantities, wherein
   the N second compressors are disposed on an ASIC
   chip disposed on the computing power board.

8. The computing apparatus according to claim 1, further
comprising:
   N third expanders, respectively connected to the N adders,
   and respectively configured to perform expansion pro-
   cessing on addition processing results of the N adders,
   wherein the N third expanders are disposed on an ASIC
   chip; and
   N third compressors, respectively connected to the N third
   expanders, and respectively configured to perform
   compression processing on expansion processing results of the N third expanders, to obtain the proof-
of-work result, wherein the N third compressors are
disposed on an ASIC chip.

9. An application-specific integrated circuit (ASIC) chip,
comprising a computing apparatus for proof of work,
wherein the computing apparatus comprising:
   N selectors, respectively configured to obtain N groups of
   first input quantities, wherein N is a positive integer
   greater than 1, wherein each of the N groups of first
   input quantities includes k first input quantities, k is a
   positive integer greater than 1;
   N first compressors, respectively connected to the N
   selectors, and respectively configured to receive the N
   groups of first input quantities sent by the N selectors,
   and to receive a same second input quantity, wherein
   each of the N first compressors is configured to perform
   compression processing on the second input quantity
   and the first input quantities in a respective one of the
   N groups of first input quantities sequentially, and
   compression processing results of the N first compres-
   sors each is used to obtain a proof-of-work result; and
   N adders, respectively connected to the N first compres-
   sors, wherein each of the N adders is configured to
   perform addition processing on a compression process-
   ing result of a respective first compressor of the N first
   compressors and a group of delayed first input quanti-
   ties corresponding to the respective first compressor,
   wherein the N groups of first input quantities are
   generated by a first generator, and N groups of delayed
   first input quantities are generated by a second genera-
   tor, the first generator and the second generator are
   different mid-state generators,
   wherein the N selectors, the N first compressors and the
   N adders are disposed on an ASIC chip disposed on a
   computing power board, the first generator and the
   second generator are disposed on a control board.

10. A computing method for proof of work, comprising:
   obtaining, by N selectors, N groups of first input quanti-
   ties, respectively, wherein N is a positive integer
   greater than 1, wherein each of the N groups of first
   input quantities includes k first input quantities, k is a
   positive integer greater than 1;
   receiving, by N first compressors connected to the N
   selectors, the N groups of first input quantities sent by
   the N selectors and a same second input quantity,
   respectively, and performing, by each of the N first
   compressors, compression processing on the second
   input quantity and the first input quantities in a respec-
   tive one of the N groups of first input quantities
   sequentially;
   obtaining a proof-of-work result according to compres-
   sion processing results of the N first compressors; and
   performing, by each of N adders respectively connected to
   the N first compressors, addition processing on a com-
   pression processing result of a respective first compres-
   sor of the N first compressors and a group of delayed
   first input quantities corresponding to the respective
   first compressor, wherein the N groups of first input
   quantities are generated by a first generator, and N
   groups of delayed first input quantities are generated by
   a second generator, the first generator and the second
   generator are different mid-state generators,
   wherein the N selectors, the N first compressors and the
   N adders are disposed on an ASIC chip disposed on a
   computing power board, the first generator and the
   second generator are disposed on a control board.

11. The computing method according to claim 10, wherein the N groups of delayed first input quantities are input to their corresponding adders by additional N selectors, respectively.

12. The computing method according to claim 10, wherein each group of first input quantities is generated by the first generator according to different version numbers in a block header, and each group of delayed first input quantities is generated by the second generator according to the different version numbers in the block header.

13. The computing method according to claim 10, wherein the second input quantity comprises a message field of a block header, and the message field comprises at least one of the following:

last 32 bits of a hash Merkle root, a timestamp, a difficulty, a nonce, or a padding bit.

14. The computing method according to claim 13, further comprising:

performing, by a first expander, expansion processing on a mid-state field, to obtain the second input quantity.

15. The computing method according to claim 10, wherein the first input quantity comprises a mid-state field of a block header, and the mid-state field comprises at least one of the following:

a version number, a hash value of a previous block, or first 224 bits of a hash Merkle root.

16. The computing method according to claim 15, further comprising before the obtaining, by N selectors, N groups of first input quantities, respectively:

performing, by N second expanders, expansion processing on N candidate values of the message field, respectively; and performing, by N second compressors connected to the N second expanders, compression processing on expansion processing results of the N candidate values of the message field, respectively, to obtain the N groups of first input quantities.

\* \* \* \* \*